S. P. WAAGE AND R. WARREN.
THERMALLY ACTUATED DRAIN VALVE.
APPLICATION FILED JULY 24, 1916. RENEWED SEPT. 5, 1919.
1,338,469. Patented Apr. 27, 1920.
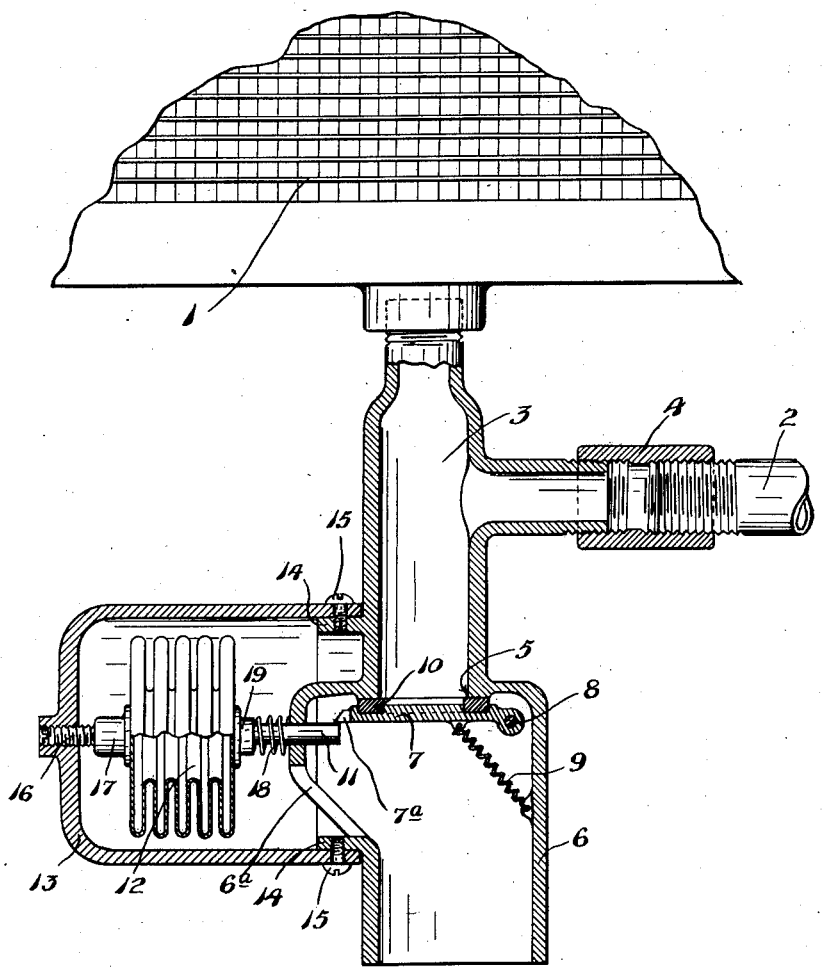

UNITED STATES PATENT OFFICE.

SIVERT P. WAAGE AND ROBERT WARREN, OF MINNEAPOLIS, MINNESOTA.

THERMALLY-ACTUATED DRAIN-VALVE.

1,338,469. Specification of Letters Patent. Patented Apr. 27, 1920.

Application filed July 24, 1916, Serial No. 110,956. Renewed September 5, 1919. Serial No. 321,963.

*To all whom it may concern:*

Be it known that we, SIVERT P. WAAGE and ROBERT WARREN, citizens of the United States, residing at Minneapolis, in the county of Hennepin and State of Minnesota, have invented certain new and useful Improvements in Thermally-Actuated Drain-Valves; and we do hereby declare the following to be a full, clear, and exact description of the invention, such as will enable others skilled in the art to which it appertains to make and use the same.

Particularly, our invention has for its object to provide an extremely simple and highly efficient thermally-actuated drain valve for the water circulating system of an automobile, but the invention is capable of more general use for draining, and thereby preventing the freezing and resulting damage of liquid containers or circulating systems. Generally stated, the invention consists of the novel construction and combinations of parts hereinafter described and defined in the claims. The improved automatic valve, while capable of modification, is preferably of the form illustrated in the accompanying drawings which is a view partly in front elevation and partly in vertical section.

In the said drawing, the automobile radiator is indicated, as an entirety, by the numeral 1 and the numeral 2 indicates a pipe that leads to the water circulating pump, not shown. This pipe 2 is assumed to be at the lowest point of the water circulating system of the automobile and the valve proper is and should be located at a still lower point, so that when opened, will drain the entire water system.

The drain valve, as shown, and as preferably constructed, comprises an elbow tube 3, the upper end of which is connected to the bottom of the radiator, and the lateral tube of which is connected by a coupling 4 to the end of the pump tube 2. Here it may be stated that in gravity cooling systems where a pump is not employed, the pipe 2 would be the return or cold water tube. The elbow tube 3 is provided with a depending tubular portion formed with an annular valve seat 5, and with a further depending and transversely enlarged portion 6.

The passage through the valve seat 5 is normally closed by a valve 7, as shown, of the flapper type, located within the tube section 6 and pivoted thereto at 8 and subject to a light coiled spring 9 that tends to throw the said valve downward and into an open position. The valve 7 has a gasket 10 of rubber or other elastic material which normally is seated and compressed against the valve seat 5, so as to tightly close the lower end of the drain tube made up of the vertical portion of the said elbow tube 3.

The valve 7 is normally held or locked in its closed position by a lock plunger 11 mounted to slide through one side of the tube section 6 with its projecting end engaged with a projecting lip 7ª of the said valve. The said plunger 11 is connected to one head of a multiplex diaphragm 12, that contains a liquid, such as alcohol, mercury, or any of the well known liquid compounds which have a high co-efficient of expansion and are non-freezing, that is, will not freeze under atmospheric temperatures.

The multiplex diaphragm 12 is mounted within a housing 13 shown as telescoped onto an annular flange 14 of the drain tube structure 3—6, and securely, but detachably held thereto by screws 15. Working with threaded engagement through the head or outer end of the housing 13 is an abutment screw 16, the end of which, presses against a hub 17 applied to the outer head of the multiplex diaphragm. A coiled spring 18 applied around the lock plunger or bolt 11, re-acts against the tube section 6 and against a hub 19 secured to the inner head of the diaphragm, and exerts a force which keeps the diaphragm contracted to as great an extent as permitted by the liquid contained therein. The diaphragm described operates as the thermally actuated controller of the automobile valve mechanism and is thought to be the best form of a device for that purpose.

Normally, as already indicated, the valve 7 is positively held in its closed position by the lock bolt or plunger 11 with the elastic gasket 10 under considerable compression.

When the temperature lowers, the diaphragm 12 will contract and at a predetermined temperature, the end of the lock bolt 11 will be withdrawn from under the lip 7ª of the valve 7, and the latter will then be automatically opened, partly by gravity and the weight of the column of water thereon, but more positively by the spring 9. The temperature at which the said valve will thus be released may be varied by adjustments of the abutment screw 16, it being, of course, obvious, that the farther the said abutment screw is moved toward the right, the lower will be the temperature required to disengage the lock bolt 11 from the said valve.

In automobile service, the adjustment should be such that the valve will be opened at a safe point in advance of the actual freezing of the water in the radiator, engine jacket and circulating pipes. Where cooling liquids other than water, and such, for example as mixture of water and alcohol, are used in the cooling system, the controlling mechanism should be set to release the valve at a temperature slightly above the freezing point of such mixture. All such regulations may be easily accomplished by adjustments of the adjustment screw 16.

Here it is important to note that in all positions of the lock bolt 11, the valve 7 will be set at a constant closed position and with its gasket under predetermined compression. Otherwise stated, adjustments of the lock plunger for release at different temperatures does not change the normal closed position of the said valve. This is due to the fact that that surface of the lock bolt that is engaged by the lips 7ª of the valve 7 slides freely past the point of contact with the said lip.

The entire device is of simple construction, may be made at comparatively small cost, and its parts easily assembled, and when assembled, the controlling elements including the multiplex diaphragm, are incased to protect them from dirt. It may be noted, however, that the wall of the depending tube portion 6 is cut away at 6ª so that the outer air will freely come into contact with the said diaphragm.

Since the valve is applied at the lowest point of the cooling system, it, of course, follows that when the valve is opened, not only the radiator and the pump, but all of the pipes and the water jacket of the engine will be completely drained.

What we claim is:

1. The combination with a fluid circulating system having a drain vent, of a downwardly opened valve of the flapper type for closing said vent, an adjustable abutment, a lock bolt directly engageable with the valve and normally holding the same in position to close said vent, and an expansible and contractible thermally actuated controller re-acting against said adjustable abutment and operating said lock bolt.

2. The combination with a fluid circulating system having a drain vent, of a downwardly opened valve of the flapper type for closing said vent, an adjustable abutment, a lock bolt directly engageable with the valve and normally holding the same in position to close said vent, an expansible and contractible thermally actuated controller re-acting against said adjustable abutment and connected to said bolt for operating it and normally holding the bolt in locking position, and a spring tending to retract said lock bolt.

3. The combination with a fluid circulating system having a drain vent with an annular valve seat, of a pivoted valve for closing said vent, a compressible gasket interposed between said valve and valve seat, a lock bolt normally holding said valve closed and said gasket under compression, a spring tending to release said lock bolt, an abutment and a multiplex expansible and contractible diaphragm re-acting against said abutment and said lock bolt and spring.

4. The combination with a fluid circulating system having a drain vent with an annular valve seat, of a pivoted valve for closing said vent, a compressible gasket interposed between said valve and valve seat, a lock bolt normally holding said valve closed and said gasket under compression, a spring tending to release said lock bolt, an adjustable abutment and a multiplex expansible and contractible diaphragm re-acting against said abutment and said lock bolt and spring.

5. The combination with a fluid circulating system having a drain vent with an annular valve seat, of a pivoted valve for closing said vent, a compressible gasket interposed between said valve and valve seat, a lock bolt normally holding said valve closed and said gasket under compression, a spring tending to release said lock bolt, an adjustable abutment and a multiplex expansible and contractible diaphragm re-acting against said abutment and said lock bolt and spring, and a housing inclosing said diaphragm and protecting the same from dirt, which housing supports the said adjustable abutment.

In testimony whereof we affix our signatures in presence of two witnesses.

SIVERT P. WAAGE.
ROBERT WARREN.

Witnesses:
BERNICE G. WHEELER,
HARRY D. KILGORE.